United States Patent [19]

Hansford

[11] 4,136,396
[45] Jan. 23, 1979

[54] DATA PROCESSING

[75] Inventor: Michael Hansford, Rugby, England

[73] Assignee: Associated Engineering Limited, England

[21] Appl. No.: 825,610

[22] Filed: Aug. 18, 1977

[30] Foreign Application Priority Data

Aug. 19, 1976 [GB] United Kingdom ............... 34535/76

[51] Int. Cl.² ...................... G05B 21/00; G06F 15/46
[52] U.S. Cl. .................... 364/554; 328/151; 340/347 SH; 364/112; 364/472; 364/552
[58] Field of Search ............... 364/544, 472, 563, 552, 364/111, 112; 340/347 SH; 331/78; 307/352, 353; 328/151

[56] References Cited

U.S. PATENT DOCUMENTS

| | | | |
|---|---|---|---|
| 3,471,685 | 10/1969 | Bishop | 364/552 |
| 3,493,874 | 2/1970 | Finkel et al. | 307/352 |
| 3,694,636 | 9/1972 | Smith, Jr. | 364/472 |
| 3,758,757 | 9/1973 | Buhler et al. | 364/112 |
| 3,763,361 | 10/1973 | Smart | 364/554 |
| 3,787,667 | 1/1974 | King et al. | 364/472 |
| 3,790,768 | 2/1974 | Chevalier et al. | 331/78 |
| 3,823,377 | 7/1974 | Keane et al. | 331/78 |
| 4,037,162 | 7/1977 | Bumgardner | 307/352 |
| 4,045,659 | 8/1977 | Akagawa et al. | 364/554 |
| 4,063,076 | 12/1977 | Morooka et al. | 364/472 |

FOREIGN PATENT DOCUMENTS 195213  0000  U.S.S.R. .................................. 331/78

Primary Examiner—Felix D. Gruber
Assistant Examiner—Errol A. Krass
Attorney, Agent, or Firm—Leydig, Voit, Osann, Mayer & Osann, Ltd.

[57] ABSTRACT

In a data processing system and method, particularly for processing data derived from a gauge which is measuring the thickness of continuous metal strip issuing from a metal processing plant, the value of the measurement data is sampled at successive time instants and the sampled values are processed such as to derive their mean and standard deviations. The successive time instants are randomly or psuedo-randomly distributed in time so as to avoid the possibility of the values of the data samples being affected by, or failing to record, any cyclical variations in the measurement data. The processed data may be used to exert a control function on the processing plant.

5 Claims, 4 Drawing Figures

DATA PROCESSING

BACKGROUND OF THE INVENTION

The invention relates to the processing of data, for example data produced by parameter-measuring transducers such as dimension-measuring gauges.

BRIEF SUMMARY OF THE INVENTION

According to the invention, there is provided a data processing system for processing measurement data, comprising an input for receiving the measurement data, sampling means operative at successive time instants for sampling the instantaneous value of the measurement data at the input, the successive time instants being randomly or pseudo-randomly distributed in time, and means connected to receive and process the sampled data values.

According to the invention, there is further provided a data processing system responsive to a dimension of continuous strip material, comprising gauge means for producing continuous analogue data representing the instantaneous value of the said dimension, control means for producing control signals at successive time instants which are randomly or pseudo-randomly distributed in time, sampling means responsive to each control signal for sampling the value of analogue data at the respective time instant, analogue to digital conversion means for converting each sampled analogue data value into digital form, a microprocessor connected to receive the successive digital-form data values and programmed to process them and to calculate the mean and standard deviation values thereof, and output means for receiving the said calculated values.

According to the invention, there is also provided a data processing method in which the value of measurement data is sampled at successive time instants and the sampled values are processed, the successive time instants being randomly or pseudo-randomly distributed in time.

DESCRIPTION OF THE DRAWINGS

Data processing systems and methods according to the invention for processing data from dimension-measuring gauges, will now be described, by way of example only, with reference to the accompanying diagrammatic drawings in which.

DESCRIPTION OF PREFERRED EMBODIMENTS

The system now to be described in more detail is for processing data received from a gauge 10 which is measuring the thickness of continuous metal strip issuing from a metal processing plant 8. The system responds to the data from the gauge and calculates the mean and standard deviation of the gauge measurements, as will be described in more detail below.

Figure 1:
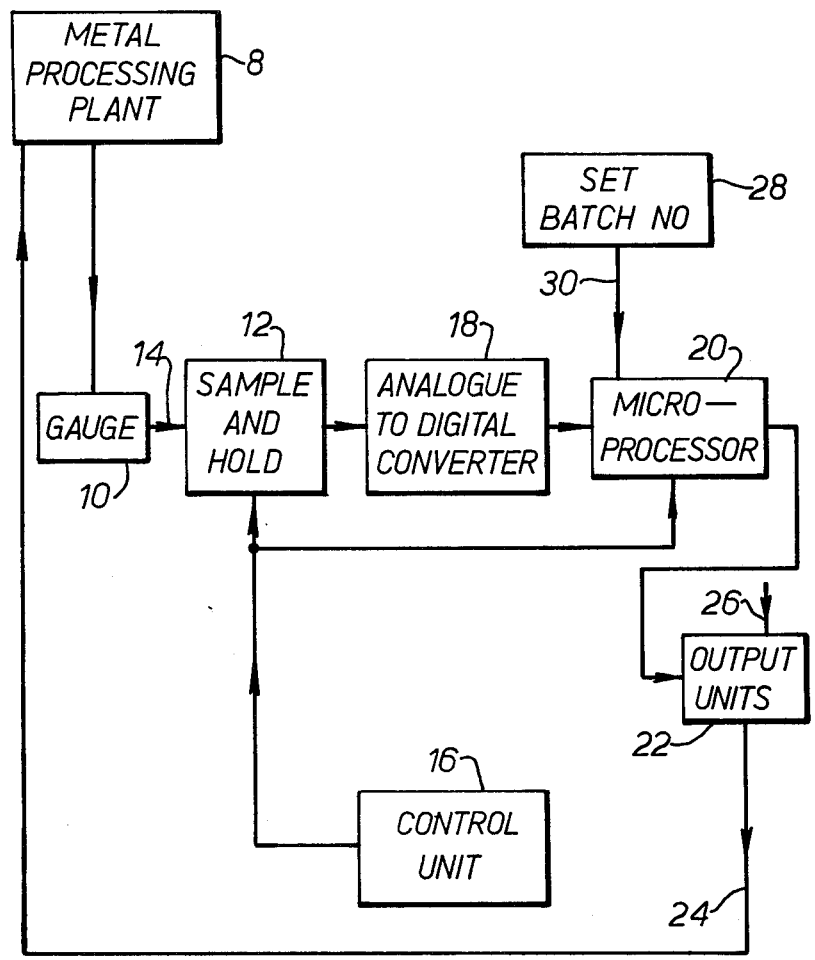
FIG. 1 is a block diagram of one of the systems.

As shown in FIG. 1, the data from the gauge 10 is fed in analogue form to a sample and hold circuit 12 by a line 14. The sample and hold circuit 12 samples the analogue gauge data under control of a control unit 16 and the sampled analogue data is then converted into digital form by an analogue to digital converter 18 and fed to a microprocessor 20. The microprocessor 20 calculates the mean and standard deviation of the gauge measurements and outputs the results of the calculations to any suitable and desired form of output unit or units. Such unit or units is represented by the block 22 but may for example comprise a printer, a visual display unit, some form of data recording unit (e.g. magnetic or punched tape) or a unit for performing further calculations on the data and/or controlling a process in dependence on the data. For example, the output block 22 may include means for controlling the metal processing plant (via a line 24) in dependence on the calculations performed by the microprocessor 20, so as to correct any errors in the measured dimension of the metal strip. For this purpose, the output block 22 may be fed with reference signals (for example, on a line 26) representing desired dimension values.

Figure 2:
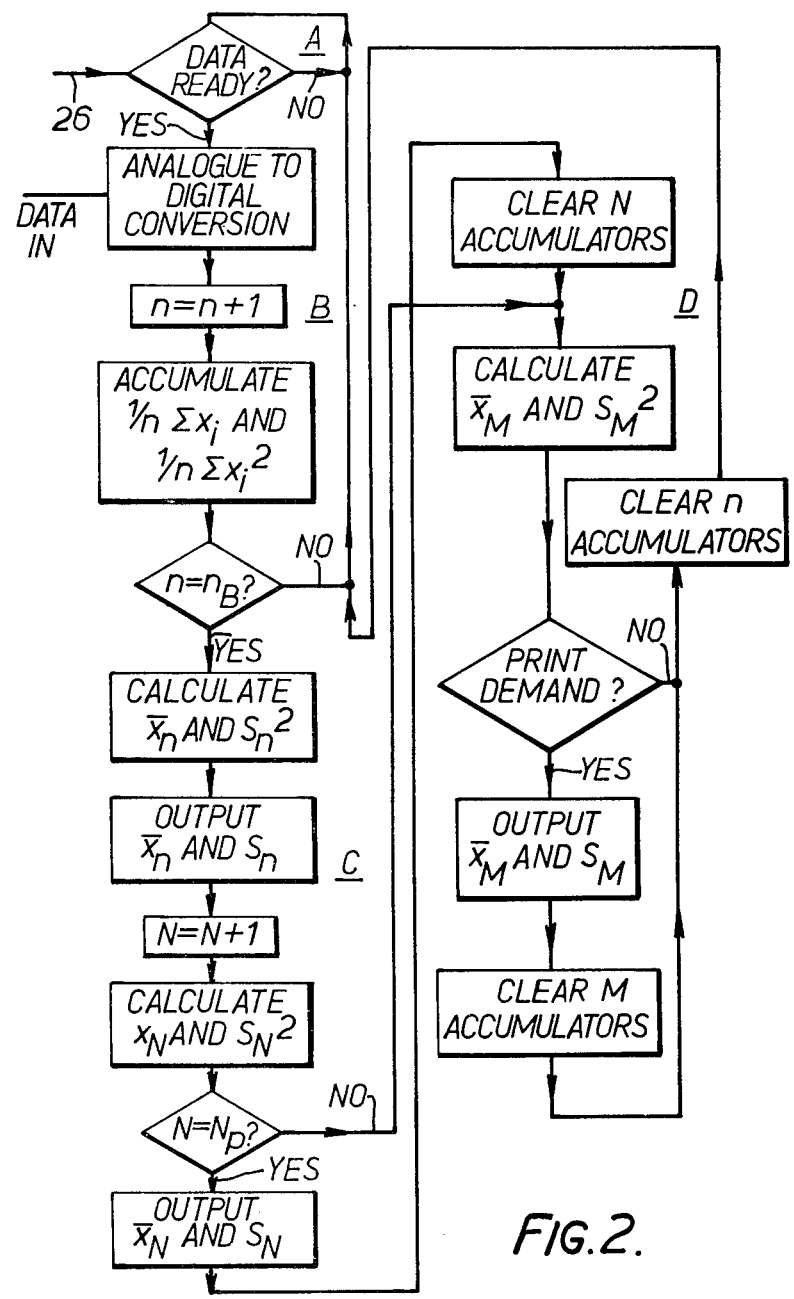
FIG. 2 illustrates the program carried out by the system of FIG. 1.

FIG. 2 illustrates the program of the microprocessor 20 and the overall sequence of operations performed by the system.

Initially, the system follows a first Loop A until a signal from the control unit 16 triggers the processing of the gauge data. The data is then fed into the analogue to digital converter 18 via the sample and hold circuit 12 and enters the microprocessor 20 where a second program Loop B is followed. In Loop B, the successive data samples are processed and the value $x_i$ of each sample is recorded. In response to each data sample the microprocessor updates two accumulators which are respectively accumulating $$\frac{1}{n} \Sigma x_i, \text{ and}$$

$$\frac{1}{n} \Sigma x_i^2$$

where n is the number of data samples so far received. Thus, in response to each sample, the total $1/n \Sigma x$ in the first accumulator is extracted and multiplied by n, and the resultant is added to the incoming value of $x_i$. The total is then divided by the new value of n and the result placed back in the accumulator. A similar process is carried out for $1/n \Sigma x^2$.

Loop B continues until the microprocessor detects that a predetermined number of data samples $n_B$ have been processed. The number $n_B$ is, for example, a batch number which may be manually set up by means of manual control 28 and a line 30 (FIG. 1). When $n_B$ samples have been processed, the system enters Loop C.

In Loop C, the mean value $\overline{x}_{n_B}$ of the $n_B$ data samples is calculated and output; this in fact simply necessitates the reading out of the data stored in the accumulator which is accumulating $1/n \Sigma x_i$. The output value $\overline{x}_{n_B}$ is fed to the output unit or units 22.

In addition, the standard deviation $S_{n_B}$ is calculated where $$S_{n_B}^2 = \frac{1}{n_B} \Sigma x_i^2 - \overline{x}_{n_B}^2$$

This calculation involves the reading out of the data stored in the register accumulating $1/n \Sigma x_i^2$, subtracting the mean value $\overline{x}_{n_B}$, and then taking the square root of the result. The value $S_{n_B}$ is then output to the output unit or units 22.

The system is also arranged to calculate the mean and standard deviation values for a predetermined number of batches. As shown in Loop C, this is carried out by accumulating the values of $\bar{x}_{n_B}$ and $S_{n_B}^2$ in two accumulators as successive batches of data samples are measured. When the number of batches N reaches the predetermined number $N_p$, the loop calculates the values $\bar{x}_{N_p}$ and $S_{N_p}$ (by averaging the accumulated values of $\bar{x}_{n_B}$ and $S_{n_B}^2$) and outputs the results. The accumulators accumulating the values of $\bar{x}_{n_B}$ and $S_{n_B}^2$ are then cleared.

The system is also arranged to calculate the mean and standard deviation over a much longer, indefinite, period.

As shown in Loop D, this is carried out by accumulating the values of $\bar{x}_{N_p}$ and $S^2_{N_p}$ in two accumulators as successive batches of data samples are measured and averaging the accumulated values to produce the quantities $\bar{x}_M$ and $S_M$ which are respectively the mean and standard deviation of M such batches. This process continues and after each accumulation the Loop tests whether a print demand has been fed (manually for example) into the microprocessor 20. When a print demand is detected, the accumulated information is outputted and the accumulators are cleared. At the same time, and also each time a test for a print demand produces a negative result, the accumulators storing the quantities $\bar{x}_n$ and $S_n^2$ are cleared.

The microprocessor 20 may take any suitable form. An example of a suitable form is the microprocessor sold under the number PM16 by Bell and Howell Limited.

Figure 3:
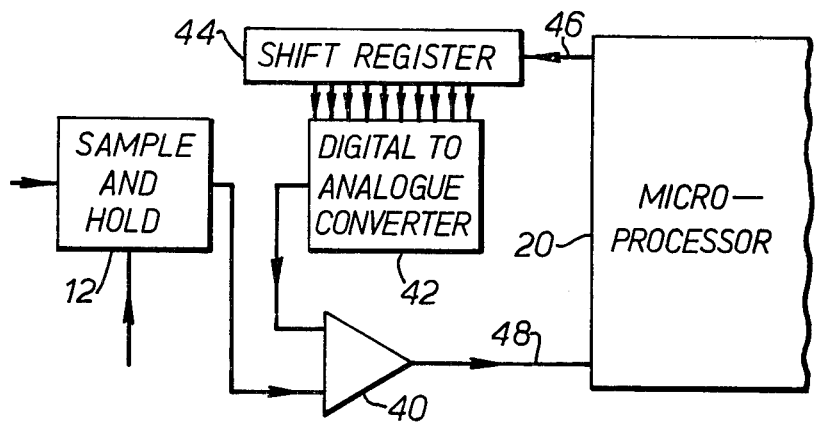
FIGS. 3 and 4 are block diagrams illustrating the parts of the system of FIG. 1 in more detail.

FIG. 3 illustrates one form which the analogue to digital converter circuit 18 may take.

As shown, the analogue data from the sample and hold circuit 12 is fed into one input of an analogue comparator 40. The second input of the latter is fed from a digital to analogue converter 42 which responds to binary data in a shift register 44. The shift register is fed with serial data from the microprocessor 20 on a line 46. The comparator 40 compares the two analogue inputs received and by means of a control line 48 causes the microprocessor 20 to increase or decrease the value of the binary data on the line 46 until equality is achieved. The binary data on the line 46 then correctly represents the sampled analogue data.

Other forms of analogue to digital conversion may be used.

Figure 4:
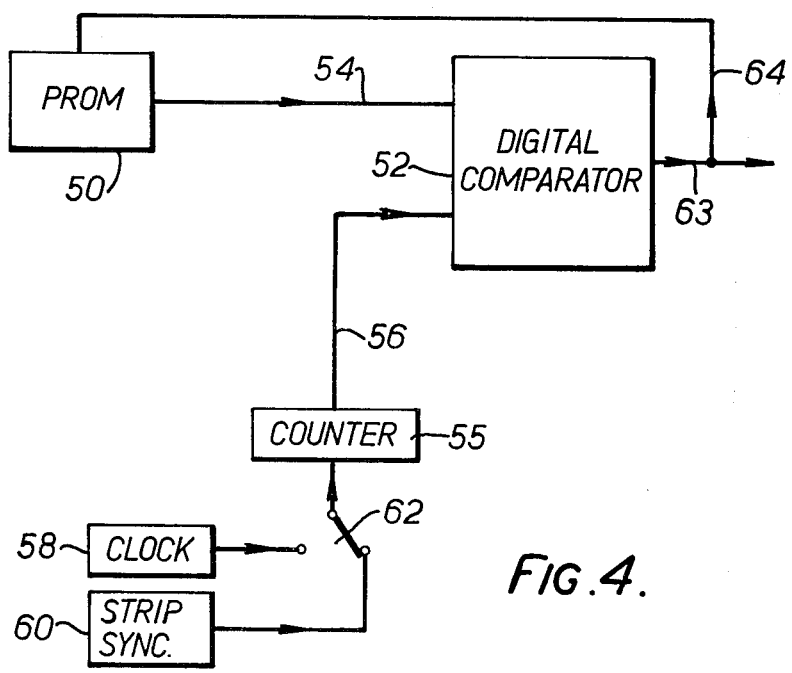

In order the prevent the possibility of the values of the data samples being affected by, or failing to record, any cyclical variation in the thickness of the metal strips (because of some malfunction in the metal processing plant for example), the control unit 16 is arranged to produce its control signals randomly or pseudo-randomly, and one possible form which the unit 16 can take is shown in FIG. 4.

As shown in FIG. 4, the control unit 16 comprises a programmable read-only memory (pROM) 50 in which is stored a series of randomly or pseudo-randomly selected numbers each of which is fed in turn to a digital comparator 52 by means of a line 54. The second input of the comparator 52 is fed from a counter 55 by means of a line 56. The counter may be driven either from a clock circuit 58 or by a unit 60 which produces clock pulses in synchronism with the movement of the metal strip being measured. The unit 60 may for example be driven by a tachogenerator responsive to the speed of the strip. A switch 62 selects either the pulses from the clock circuit 58 or the unit 60.

In operation, the comparator 52 produces a control pulse output (to the sample and hold circuit 12 and the microprocessor 20, FIG. 1) on a line 63 when the count of the counter 55 becomes equal to the number being presented to the comparator by the pROM 50. When a control pulse output occurs on line 63, a line 64 is energised and causes the pROM to present the next random number to the comparator 52.

Other forms of random interval generation may be used.

The system described is not restricted to the processing of data relating to strip measurement but may be used to process data representing any other measurements, not limited to dimensional measurements.

If the data is presented in digital form, then of course the analogue to digital converter circuit 18 is not needed.

The system described may be arranged by suitable programming of the microprocessor 20 to respond to gauge data which indicates not an actual dimension of an article but merely whether that dimension is above or below a preset limit.

What is claimed is:

1. A data processing system for processing measurement data, comprising, in combination,
   an input for receiving the measurement data,
   sampling means connected to the input and operative when activated to sample the instantaneous value of the measurement data at the input,
   control means connected to the sampling means and operative to produce control signals each of which activates the sampling means, the control means producing the control signals at successive time instants which are randomly or pseudo-randomly distributed in time, and
   data processing means connected to receive and process the sampled data values, the data processing means comprising accumulating means for accumulating the sampled data values to derive their mean and standard deviations.

2. A system according to claim 1, in which the means for receiving and processing the sampled data values includes a microprocessor.

3. A system according to claim 1, in combination with apparatus for carrying out operations on material a parameter of which is represented by the measurement data, and including means responsive to the processed data values and connected to the said apparatus to adjust the apparatus in dependence on the processed data values to cause the apparatus to maintain the said parameter at a desired value.

4. In combination, apparatus for producing metal strip, and measuring and control means for measuring the thickness of the metal strip and controlling the apparatus to produce the strip to a predetermined thickness, the measuring and control means comprising
   gauge means positioned at the output of the strip material producing apparatus and producing continuous analogue data representing the instantaneous value of the said thickness dimension of the strip,
   timing means producing timing signals at successive time instants which are randomly or pseudo-randomly distributed in time,
   sampling means connected to receive each timing signal and operative in response thereto to sample the value of analogue data produced by the gauge means at the respective time instant, analogue to digital conversion means connected to receive each sampled analogue data value and to convert it into digital form, a microprocessor connected to receive the successive digital-form data values and programmed to accumulate them and to calculate the mean and standard deviation values of the accumulated data values, output means connected to receive the said calculated values and to receive a reference signal representing a desired value of the said thickness dimension and operative to produce a correction signal when a comparison of the calculated values and the reference signal indicates that the thickness dimension of the strip does not have the predetermined thickness, and means feeding the correction signal to the strip material producing apparatus so as to adjust the thickness dimension towards the desired value.

5. A data processing method, comprising the steps of sampling the value of measurement data at successive time instants, controlling the successive time instants to be randomly or pseudo-randomly distributed in time, accumulating a predetermined batch of the sampled values, and processing the accumulated batch of sampled values to derive their mean and standard deviations.

* * * * *